(12) United States Patent
Kegel et al.

(10) Patent No.: US 10,970,118 B2
(45) Date of Patent: Apr. 6, 2021

(54) SHAREABLE FPGA COMPUTE ENGINE

(71) Applicant: Advanced Micro Devices, Inc., Santa Clara, CA (US)

(72) Inventors: Andrew G. Kegel, Redmond, WA (US); David A. Roberts, Wellesley, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 33 days.

(21) Appl. No.: 15/974,014

(22) Filed: May 8, 2018

(65) Prior Publication Data

US 2019/0042313 A1 Feb. 7, 2019

Related U.S. Application Data

(60) Provisional application No. 62/540,217, filed on Aug. 2, 2017.

(51) Int. Cl.
*G06F 9/46* (2006.01)
*G06F 9/50* (2006.01)
*G06F 15/78* (2006.01)
*G06F 9/52* (2006.01)

(52) U.S. Cl.
CPC .......... *G06F 9/5027* (2013.01); *G06F 9/5011* (2013.01); *G06F 9/5022* (2013.01); *G06F 9/52* (2013.01); *G06F 15/7867* (2013.01)

(58) Field of Classification Search
CPC .... G06F 9/5027; G06F 9/5011; G06F 9/5022; G06F 9/52; G06F 15/7867
See application file for complete search history.

(56) References Cited

U.S. PATENT DOCUMENTS

| | | | |
|---|---|---|---|
| 4,481,573 A | 11/1984 | Fukunaga et al. |
| 4,779,188 A | 10/1988 | Gum et al. |
| 5,123,101 A | 6/1992 | Sindhu |
| 5,230,045 A | 7/1993 | Sindhu |

(Continued)

OTHER PUBLICATIONS

Matoga et al, Accelerating user-space applications with FPGA cores: profiling and evaluationo fnth ePCle interface, INESC-ID, 2013, 8 pages.*

(Continued)

*Primary Examiner* — Diem K Cao
(74) *Attorney, Agent, or Firm* — Kowert Hood Munyon Rankin and Goetzel PC; Rory D. Rankin

(57) ABSTRACT

Systems, apparatuses, and methods for sharing an field programmable gate array compute engine are disclosed. A system includes one or more processors and one or more FPGAs. The system receives a request, generated by a first user process, to allocate a portion of processing resources on a first FPGA. The system maps the portion of processing resources of the first FPGA into an address space of the first user process. The system prevents other user processes from accessing the portion of processing resources of the first FPGA. Later, the system detects a release of the portion of the processing resources on the first FPGA by the first user process. Then, the system receives a second request to allocate the first FPGA from a second user process. In response to the second request, the system maps the first FPGA into an address space of the second user process.

20 Claims, 9 Drawing Sheets

(56) References Cited

U.S. PATENT DOCUMENTS

| | | | |
|---|---|---|---|
| 5,493,660 | A | 2/1996 | DeLano et al. |
| 5,574,878 | A | 11/1996 | Onodera et al. |
| 5,640,533 | A | 6/1997 | Hays et al. |
| 5,644,748 | A | 7/1997 | Utsunomiya et al. |
| 5,740,417 | A | 4/1998 | Kennedy et al. |
| 5,897,664 | A | 4/1999 | Nesheim et al. |
| 5,949,423 | A | 9/1999 | Olsen |
| 6,226,012 | B1 | 5/2001 | Priem et al. |
| 6,239,808 | B1 | 5/2001 | Kirk et al. |
| 6,266,064 | B1 | 7/2001 | Snyder |
| 6,266,753 | B1 | 7/2001 | Hicok et al. |
| 6,510,525 | B1 | 1/2003 | Nookala et al. |
| 6,553,501 | B1 | 4/2003 | Yokoe |
| 6,631,447 | B1 | 10/2003 | Morioka et al. |
| 6,681,239 | B1 | 1/2004 | Munroe et al. |
| 6,681,297 | B2 | 1/2004 | Chauvel et al. |
| 6,751,706 | B2 | 6/2004 | Chauvel et al. |
| 6,801,207 | B1 | 10/2004 | Tischler et al. |
| 6,801,208 | B2 | 10/2004 | Keshava et al. |
| 6,819,321 | B1 | 11/2004 | Hsieh et al. |
| 6,825,848 | B1 | 11/2004 | Fu et al. |
| 6,842,180 | B1 | 1/2005 | Maiyuran et al. |
| 6,891,543 | B2 | 5/2005 | Wyatt |
| 6,895,491 | B2 | 5/2005 | Kjos et al. |
| 6,954,864 | B2 | 10/2005 | Schelling |
| 6,988,214 | B1 | 1/2006 | Verdun |
| 7,023,445 | B1 | 4/2006 | Sell |
| 7,030,877 | B1 | 4/2006 | Sell |
| 7,152,169 | B2 | 12/2006 | Cooper et al. |
| 7,159,766 | B2 | 1/2007 | Wurzburg et al. |
| 7,200,762 | B2 | 4/2007 | Pearl |
| 7,213,125 | B2 | 5/2007 | de Dinechi et al. |
| 7,383,415 | B2 | 6/2008 | Jordan et al. |
| 7,383,423 | B1 | 6/2008 | Hughes et al. |
| 7,398,371 | B2 | 7/2008 | Plondke et al. |
| 7,716,673 | B2 | 5/2010 | Chauvel et al. |
| 8,028,185 | B2 | 9/2011 | Branover et al. |
| 8,364,933 | B2 | 1/2013 | Herrenschmidt et al. |
| 8,607,008 | B1 | 12/2013 | Glasco et al. |
| 8,930,674 | B2 | 1/2015 | Avudaiyappan et al. |
| 9,389,915 | B2 * | 7/2016 | Chang ............... G06F 9/48 |
| 9,405,702 | B2 | 8/2016 | Mukherjee et al. |
| 9,892,058 | B2 | 2/2018 | Wilkes |
| 2004/0025161 | A1 | 2/2004 | Chauvel et al. |
| 2004/0260905 | A1 | 12/2004 | Cypher et al. |
| 2004/0260906 | A1 | 12/2004 | Landin et al. |
| 2006/0026382 | A1 | 2/2006 | Hirano et al. |
| 2006/0294288 | A1 | 12/2006 | Seth et al. |
| 2006/0294341 | A1 | 12/2006 | Plondke et al. |
| 2007/0061547 | A1 | 3/2007 | Jordan et al. |
| 2008/0162868 | A1 | 7/2008 | Glew |
| 2009/0150696 | A1 | 6/2009 | Song et al. |
| 2009/0164814 | A1 | 6/2009 | Axford et al. |
| 2010/0306499 | A1 | 12/2010 | Petolino, Jr. |
| 2011/0208944 | A1 | 8/2011 | Champagne et al. |
| 2013/0346985 | A1 | 12/2013 | Nightingale |
| 2014/0040562 | A1 | 2/2014 | Koka et al. |
| 2014/0101411 | A1 | 4/2014 | Sakarda |
| 2015/0301953 | A1 | 10/2015 | Bybell et al. |
| 2016/0378674 | A1 | 12/2016 | Cheng et al. |
| 2017/0017523 | A1* | 1/2017 | Guccione ............... G06F 9/5011 |
| 2018/0129770 | A1* | 5/2018 | Tamir ................... G06F 17/5054 |
| 2018/0205553 | A1* | 7/2018 | Hoppert ................. G06F 21/44 |

OTHER PUBLICATIONS

International Search Report and Written Opinion in International Application No. PCT/US2018/035377, dated Sep. 12, 2018, 10 pages.

Byma et al., "FPGAs in the Cloud: Booting Virtualized Hardware Accelerators with OpenStack", 2014 IEEE 22nd Annual International Symposium on Field-Programmable Custom Computing Machines, May 11, 2014, pp. 109-116.

Xia et al., "Hypervisor Mechanisms to Manage FPGA Reconfigurable Accelerators", 2016 International Conference on Field-Programmable Technology (FPT), Dec. 7, 2016, pp. 44-52.

Caulfield et al., "A Cloud-Scale Acceleration Architecture", The 49th Annual IEEE/ACM International Symposium on Microarchitecture, Oct. 15, 2016, 13 pages.

Shebanow et al., U.S. Appl. No. 10/676,625, entitled "Caching Compressed Graphics Data for Reduced Power Consumption", filed Oct. 1, 2003, 32 pages.

Pabst, Thomas, "High-Tech and Vertex Juggling—NVIDIAs New GeForce3 GPU", Toms Hardware, Feb. 27, 2001, 39 pages, http://www.tomshardware.com/print/high,reviews-294.html. [Retrieved Jan. 13, 2016].

Berillo, Aleksey, "S3TC and FXT1 Texture Compression", Nov. 30, 2000, IXBT Labs, 17 pages, http://xbtlabs.com/articles/reviews3tcfxt1/. [Retrieved Jan. 13, 2016].

Greene, et al., "Hierarchical Z-Buffer Visibility", 93 Proceedings of the 20th Annual Conference on Computer Graphics and Interactive Techniques, Sep. 1, 1993, 7 pages, ACM, New York, New York, USA.

Parthsarathy, Mohan, "A method for reducing TLB purge overheads associated with context switching between guests in a virtual machine environment", Hewlett-Packard Company, Research Disclosure, Database No. 547039, Nov. 2009, 4 pages, https://rd.orbit.com/rd/search/RD547039.pdf. [Retrieved Mar. 24, 2017].

Lei et al., "Leakage Efficient TLB Design for Embedded Processors", Information Processing Society of Japan, Technical Report, Aug. 4, 2009, 9 pages, vol. 2009-ARC184, No. 13, https://ipsj.ixsq.nii.ac.ac.jp/index.phpaction=pages_view_main active_action=repository_action_common_download item_id=62709 item_no=1 attribute_id=1 file_no=1 page_id=13 block_id=8. [Retrieved on Mar. 24, 2017].

* cited by examiner

US 10,970,118 B2

SHAREABLE FPGA COMPUTE ENGINE

CROSS REFERENCE TO RELATED APPLICATIONS

This application claims priority to Provisional Patent Application Ser. No. 62/540,217 entitled "Shareable FPGA Compute Engine," filed Aug. 2, 2017, the entirety of which is incorporated herein by reference.

The invention described herein was made with government support under PathForward Project with Lawrence Livermore National Security Prime Contract No. DE-AC52-07NA27344, Subcontract No. B620717 awarded by the United States Department of Energy. The United States Government has certain rights in the invention.

BACKGROUND

Description of the Related Art

A field-programmable gate array (FPGA) is an integrated circuit device that is programmable by an end user after the FPGA is installed on a circuit board. In general, an FPGA includes an array of uncommitted circuit elements, which are called logic blocks. These logic blocks are connected together by interconnect resources making up a programmable interconnect fabric. The interconnect resources include logic gates that are inter-wired in multiple, different configurations. The logic blocks in the FPGA are configured to perform complex combinational or logic functions. In some examples, the logic blocks in an FPGA also include memory elements, which are implemented as flip-flops or more complete blocks of memory.

In an FPGA, the logic blocks can include elements such as lookup tables (LUTs) and other fixed functions that are programmed by inserting values into small Static Random Access Memories (SRAMs) or registers. The programming of the FPGA is performed before the logic blocks can be used. After programming, each combination of function inputs to an LUT results in a predefined output, allowing implementation of any logic function.

Although FPGAs are designed to be used as programmable logic engines in the general case, many times the overhead is high. For example, when the FPGA is shared by multiple processors running different computer programs, the repeated programming, inputting data and releasing steps performed for the FPGA consume an appreciable amount of time and resources. Therefore, the use of the FPGA reduces to being used as a fixed-function logic block in the usual deployment. This type of use reduces the flexible capability provided by the FPGA.

In view of the above, methods and systems for sharing an FPGA compute engine are desired.

BRIEF DESCRIPTION OF THE DRAWINGS

The advantages of the methods and mechanisms described herein may be better understood by referring to the following description in conjunction with the accompanying drawings, in which.

Figure 1:
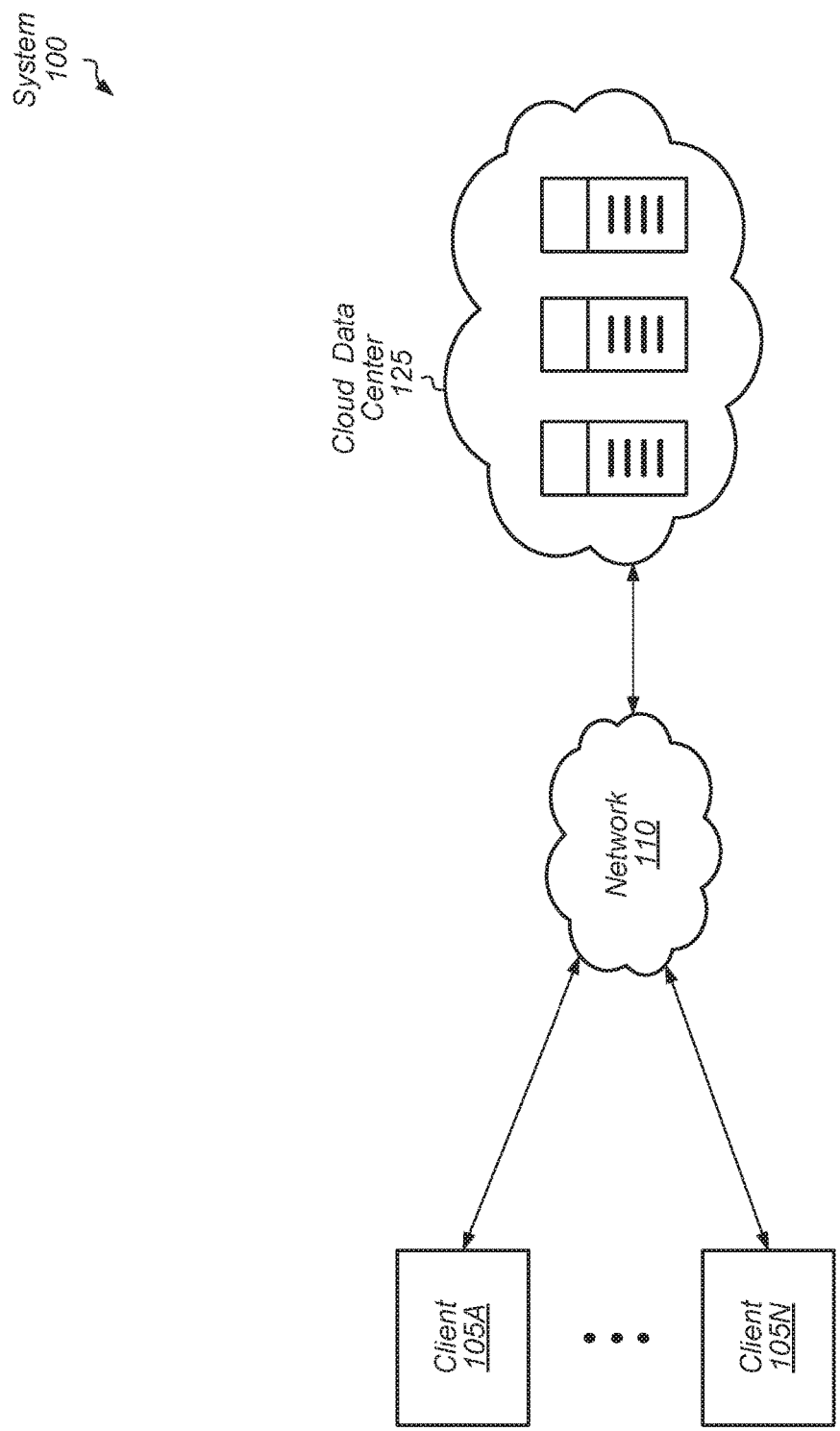
FIG. 1 is a block diagram of one implementation of a system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

In various implementations, a system includes one or more processors, one or more memories and one or more field programmable gate arrays (FPGAs). The system receives a request to allocate a first FPGA. In some implementations, the request is generated by a first user process, and at least a first portion of processing resources of the first FPGA is mapped into an address space of the first user process. In some implementations, the first portion of processing resources are programmed by the first user process and input data is provided to the first FPGA. The system prevents other user processes different from the first process from accessing the first portion of processing resources of the first FPGA.

At a later point in time, results are conveyed from the first FPGA to the first user process, and the system detects a release of the first portion of the processing resources on the first FPGA by the first user process. Following, the system receives a second request from a second user process to allocate the first FPGA. In response to the second request, the system maps at least a second portion of processing resources of the first FPGA into an address space of the second user process. In some implementations, the second portion of processing resources is the same as the first portion of processing resources. In other implementations, the second portion of processing resources is different from the first portion of processing resources. Similar steps above for the first user process on the first portion of the processing resources of the first FPGA occur for the second user process on the second portion of processing resources of the first FPGA. Therefore, the first FPGA is not reduced to being used as a fixed-function logic block, but rather, the first FPGA is used as a programmable logic engine among multiple user processes.

Referring now to FIG. 1, a block diagram of one implementation of a system 100 is shown. System 100 includes clients 105A-105N, network 110, and cloud data center 125. In various implementations, cloud data center 125 includes any number and type of physical machines, such as computers and/or servers (e.g., database server, file server, application server), and any number and type of storage devices. The physical machines of cloud data center 125 include any number and type of processors for executing instructions and/or implementing logic and combinatorial resources. It is noted that in various other implementations, system 100 includes other components and/or the components are arranged differently.

Cloud data center 125 is representative of any type of computer cluster or collection of multiple physical machines that are connected and work together. For example, in one implementation, cloud 125 represents a cloud computing provider with multiple servers. In another implementation, cloud 125 represents a high performance computing (HPC) system with multiple compute nodes. In a further implementation, cloud 125 represents a front-end/back-end system. In a still further implementation, cloud 125 represents a multi-layer system with multiple physical computers.

In one implementation, cloud data center 125 is configured to offer cloud computing resources to multiple organizations, companies, or individuals. Cloud computing is the delivery of computing as a service where shared resources, software, and information are provided to computers and other devices over a network. Cloud computing provides computation, software, data access, and data storage services. Many cloud computing infrastructures consist of services delivered through shared data centers and appear as a single point of access. In some implementations, cloud data center 125 includes a plurality of servers, including dynamically scalable or virtualized servers.

In various implementations, network 110 is any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 further includes remote direct memory access (RDMA) hardware and/or software, transmission control protocol/internet protocol (TCP/IP) hardware and/or software, router, repeaters, switches, grids, and/or others. One or more of protocols such as Fibre Channel, Fibre Channel over Ethernet (FCoE), iSCSI, and so forth is used in network 110.

Clients 105A-105N are representative of any number of devices which are connected to cloud 125 via network 110. In various implementations, each of clients 105A-105N corresponds to any of various types of computer systems or computing devices, including, but not limited to, a personal computer system, desktop personal computer (PC), laptop or notebook computer, supercomputer, tablet, phone, smartphone, wearable device, personal digital assistant (PDA), mainframe computer system, handheld computer, workstation, network computer, a consumer device, load balancer, server, file server, application server, storage server, server farm or in general any type of computing system or device. Generally speaking, clients 105A-105N include one or more processors including one or more processor cores. Each processor core includes circuitry for executing instructions according to an instruction set architecture. The processor cores access cache memory subsystems for data and computer program instructions. The cache subsystems are coupled to a memory hierarchy including random access memory (RAM) and a storage device.

Figure 2:
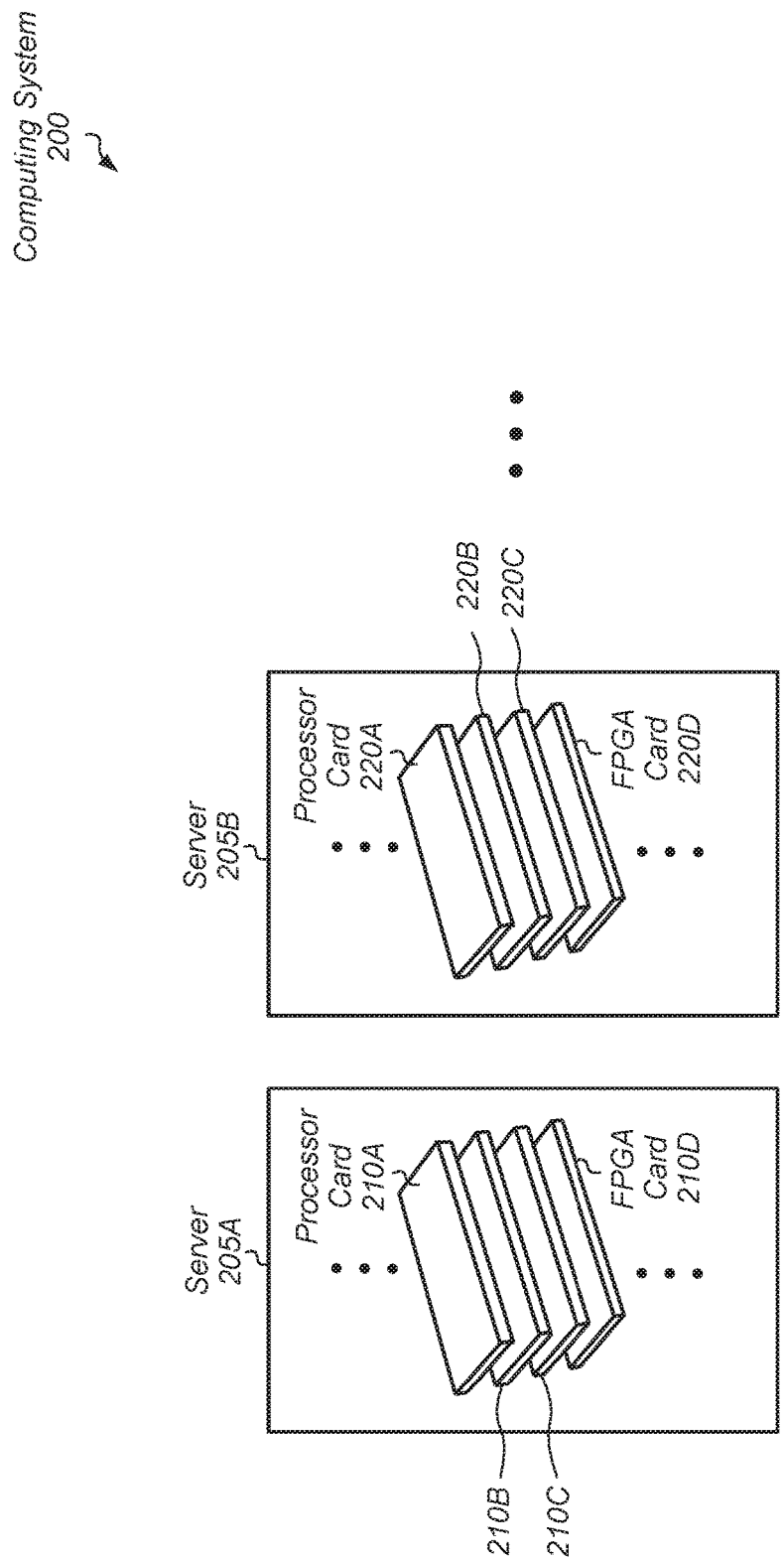
FIG. 2 is a block diagram of one implementation of a cloud computing system.

Turning now to FIG. 2, a block diagram of one implementation of a cloud computing system 200 is shown. Cloud computing system 200 includes a plurality of servers 205A-B, which are representative of any number and type of servers. In various implementations, server 205A-B includes a plurality of circuit boards, which are also referred to as cards. For example, server 205A includes processor cards 210A-C and FPGA card 210D. Server 205A also includes any number and type of other cards. Each card also includes memory and other logic in addition to processors or FPGAs. Similarly, server 205B includes processor cards 220A-C and FPGA card 220D. In some implementations, one or more of servers 205A-B includes an FPGA on a motherboard along with a processor in addition to FPGA cards 210D and 220D. In other implementations, one or more of servers 205A-B includes an FPGA with a processor in an integrated processing unit in addition to FPGA cards 210D and 220D.

In one implementation, user processes executing on one of the processor cards 210A-C access and utilize the resources on FPGA card 210D. For example, a first user process executes an instruction to request FPGA resources from the operating system (OS). The OS enables access to the FPGA resources by mapping the FPGA resources into the address space of the first user process in response to receiving the request. Then, the first user process programs one or more FPGAs, configures the programmed FPGAs, and then transfers data to be processed by the programmed and configured FPGAs. The FPGAs write the processed data to a memory location in the address space of the first user process. Then, the first user process retrieves the data. User processes are able to start the FPGA and stop the FPGA by executing a specific instruction, writing to a given register, or by making a request to the OS. User processes are also able to change the clock speed or other performance and power parameters of the FPGA while the FPGA is under control of the user process.

After the first user process retrieves the processed data, the first user process returns control of the FPGAs to the OS. Then, in some implementations, other user processes executing on processor cards 210A-C request and utilize the FPGA resources for subsequent computation. Multiple user processes are able to access the same FPGA resources using these techniques. In other implementations, other suitable techniques for sharing FPGA resources among a plurality of user processes are possible and are contemplated.

Figure 3:
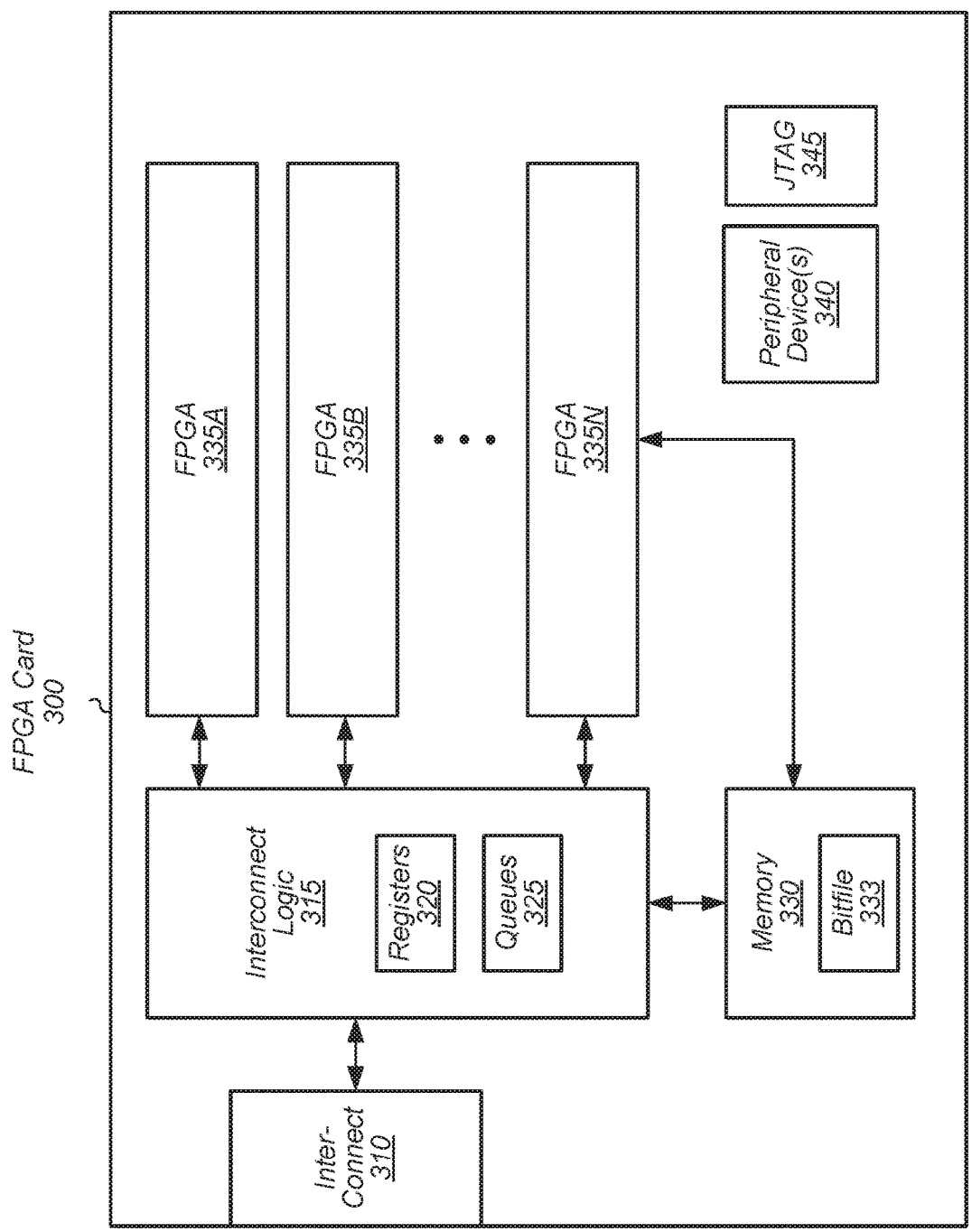
FIG. 3 is a block diagram of one implementation of a FPGA card.

Referring now to FIG. 3, a block diagram of one implementation of a FPGA card 300 is shown. In one implementation, FPGA card 300 includes interconnect 310, interconnect logic 315, memory 330, FPGAs 335A-N, peripheral device(s) 340, and JTAG interface 345. Interconnect 310 is representative of any type of interconnect for interfacing with processor cards (e.g., processor cards 210A-C of FIG. 2) and/or with other components. In one implementation, interconnect 310 is a PCIe interconnect. In another implementation, interconnect 310 is a Gen-Z compatible interconnect. In another implementation, interconnect 310 is a CCIX compatible interconnect. Although the components of FPGA card 300 are illustrated as being on a card, in other implementations one or more of the components are integrated on a motherboard or integrated within a processing unit package.

Interconnect logic 315 interfaces between interconnect 310, accelerators 335A-N, and memory 330. In various implementations, interconnect logic 315 is implemented using an FPGA, a programmable logic device, or another device. In one implementation, interconnect logic 315 includes registers 320 and queue 325. In another implementation, interconnect logic 315 includes only registers 320 without queues 325. Alternatively, in a further implementation, interconnect logic 315 includes only queues 325 without registers 320.

In one implementation, user processes executing on a processor card interface with one or more FPGAs 335A-N via registers 320 and/or queues 325. For example, when a user process executes an instruction to program a given FPGA 335, the instruction causes a value to be written to first register of registers 320 to initiate the programming process. The instruction also writes a value into a second register of registers 320 to indicate where a bitfile 333 is stored, wherein the bitfile is used for programming the given FPGA 335. For example, in one implementation, the user process stores bitfile 333 in memory 330, and the user process specifies that bitfile 333 should be used to program the given FPGA 335.

In another implementation, a library of functions are provided for a user to select from for generating bitfiles to program FPGAs 335. For example, different neural network functions, machine learning functions, compression functions, encryption functions, fast fourier transform (FFT) functions, and/or other types of functions are provided in this library. In an implementation, the user process selects from and/or combines various functions from the library to generate bitfiles for programming FPGAs 335A-N. The user process then provides their own data to be processed by the programmed FPGAs 335A-N. In some cases, the user combines functions selected from the library with unique logic provided by the user to generate bitfiles. Other variations of techniques for generating bitfiles are possible and are contemplated.

FPGAs 335A-N are representative of any number and type of programmable devices, accelerator devices, or other types of devices. In one implementation, multiple user processes utilize different partitions of a given FPGA 335. For example, the given FPGA 335 are programmed with a bitfile, and then different user processes access different partitions of the given FPGA 335 for use in processing different datasets.

Figure 4:
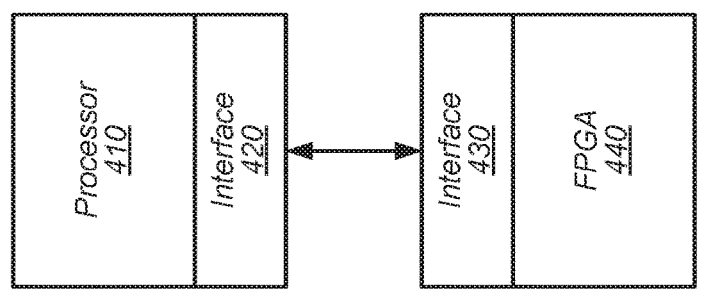
FIG. 4 is a block diagram of a system with a processor coupled to a FPGA.

Turning now to FIG. 4, a block diagram of one implementation of a system 400 is shown. System 400 includes at least processor 410 and interface 420 coupled to interface 430 and FPGA 440. FPGA 440 is representative of any type of programmable device, accelerator, or other similar component. In other implementations, FPGA 440 is one of multiple other types of devices (e.g., application specific integrated circuit (ASIC), graphics processing unit (GPU), digital signal processor (DSP)).

Interfaces 420 and 430 are representative of any type of interface. In one implementation, interfaces 420 and 430 are Peripheral Component Interconnect Express (PCIe) interfaces. In some implementations, system 400 supports resources in FPGA 440 where the hardware functions are altered by the requesting program executing on processor 410. System 400 allows for virtualization, partitioning, sequential sharing, and recovery of resources on FPGA 440. In one implementation, FPGA 440 presents one physical function to processor 410 for control purposes. In this implementation, FPGA 440 presents multiple virtual functions to processor 410 for programming and use.

Figure 5:
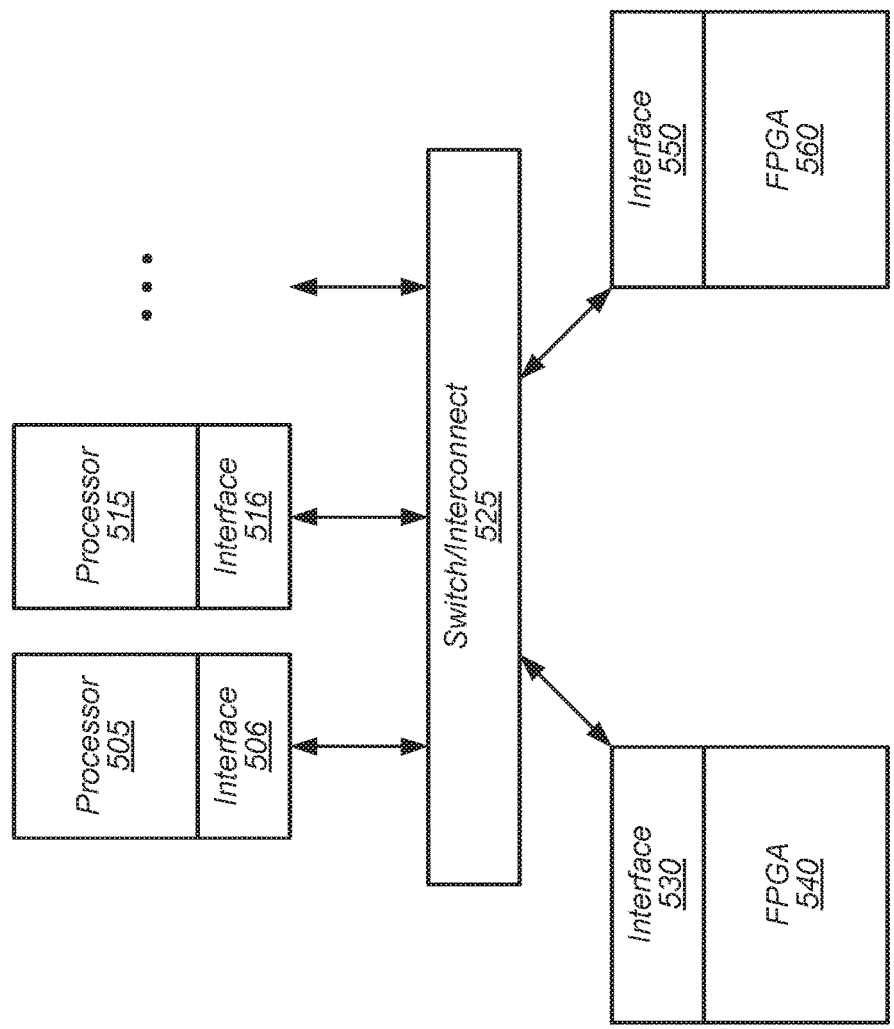
FIG. 5 is a block diagram of a system with multiple processors coupled to multiple FPGAs.

Referring now to FIG. 5, a block diagram of one implementation of a system 500 is shown. System 500 includes processors 505 and 515 coupled to switch/interconnect 525 via interfaces 506 and 516, respectively. System 500 also includes FPGAs 540 and 560 coupled to switch/interconnect 525 via interfaces 530 and 550, respectively. FPGAs 540 and 560 are representative of any number and type of programmable devices or accelerator devices.

In an implementation, each one of FPGAs 540 and 560 is partitioned by the operating system using the physical function. Each partition is presented to user processes executing on processors 505 and/or 515 using conventional memory management hardware. Furthermore, each partition is shared among multiple processes executing on processors 505 and/or 515 using multiple mappings of memory management hardware. User processes executing on processors 505 and/or 515 program FPGAs 540 and 560, feed data to FPGAs 540 and 560, obtain results from FPGAs 540 and 560, and release FPGAs 540 and 560 to be used by another user process.

In one implementation, system 500 is a distributed computing system (e.g., cluster). For example, in one implementation, subscribers to a cloud service are able to access resources in the FPGAs 540 and 560 from programs executing on processors 505 and/or 515.

Figure 6:
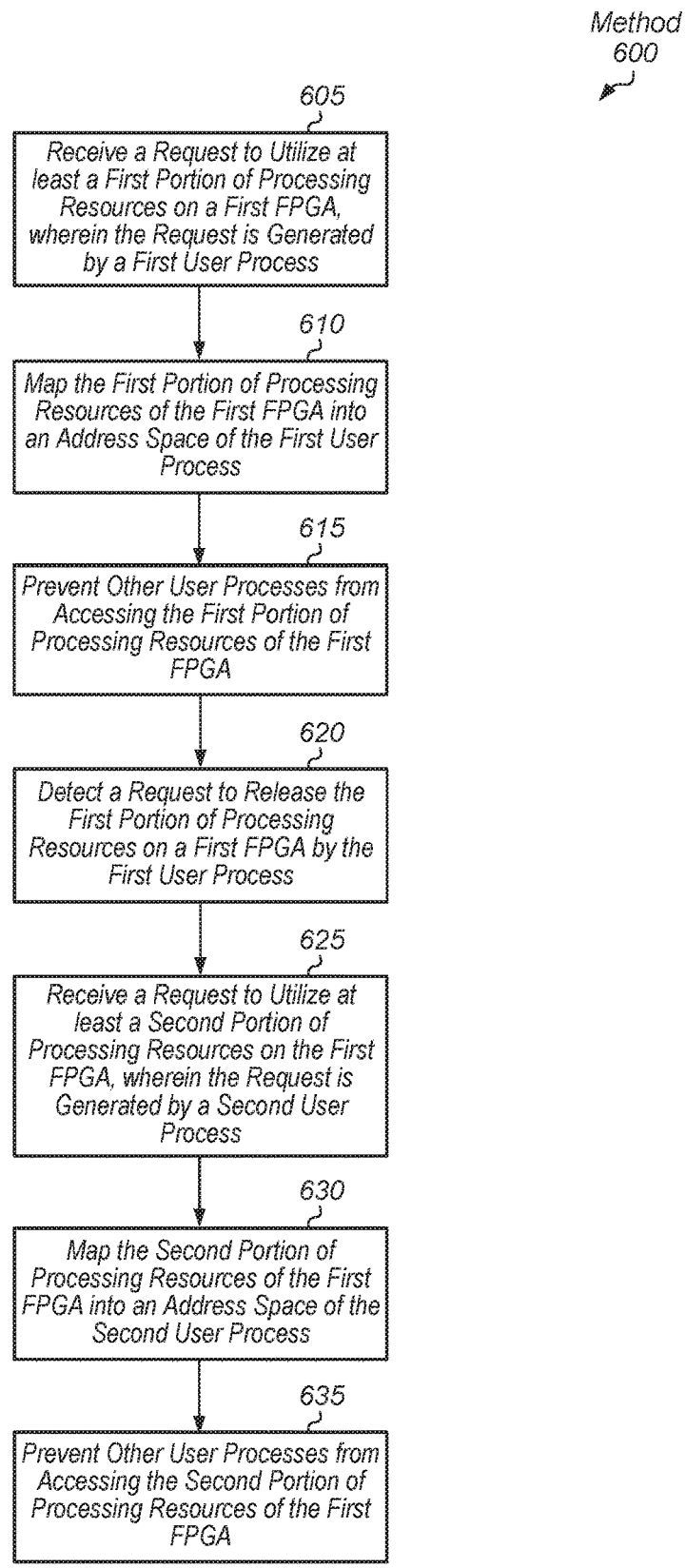
FIG. 6 is a generalized flow diagram illustrating one implementation of a method for sharing an FPGA compute engine.
Figure 7:
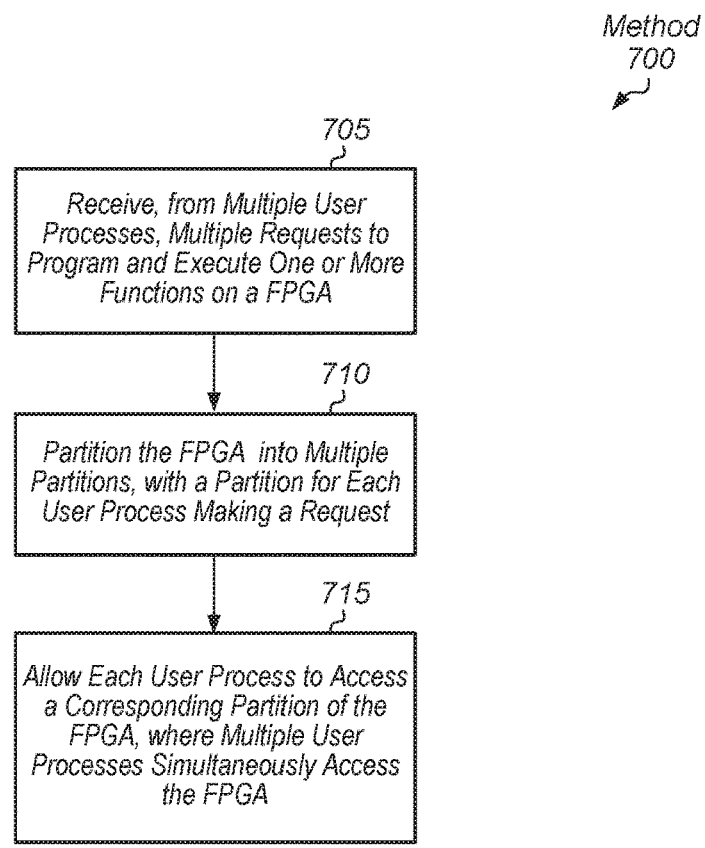
FIG. 7 is a generalized flow diagram illustrating another implementation of a method for sharing an FPGA compute engine.
Figure 8:
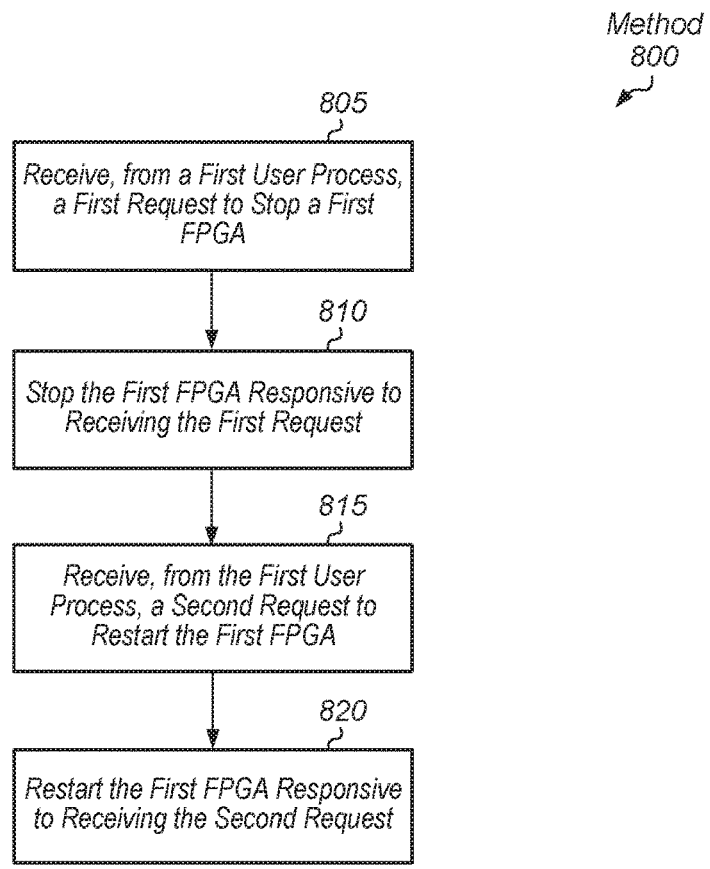
FIG. 8 is a generalized flow diagram illustrating one implementation of a method for controlling an FPGA compute engine.

Turning now to FIG. 6, one implementation of a method 600 for sharing a FPGA compute engine is shown. For purposes of discussion, the steps in this implementation and those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

An operating system (OS) receives a request to utilize at least a first portion of processing resources on a first FPGA, wherein the request is generated by a first user process (block 605). It is noted that in other implementations, the system includes any number of FPGAs in addition to the first FPGA. In some cases, the first user process requests the resources of multiple FPGAs. Next, the OS maps the first portion of processing resources of the first FPGA into an address space of the first user process (block 610). Then, the OS prevents other user processes from accessing the first portion of processing resources of the first FPGA (block 615).

At a later point in time, the OS detects a request to release the first portion of the processing resources on the first FPGA by the first user process (block 620). Next, the OS receives a request to utilize at least a second portion of the processing resources on the first FPGA, wherein the request is generated by a second user process (block 625). It is noted that in an implementation, the second portion is the same as the first portion. Alternatively, in other implementations, the second portion is different from the first portion of processing resources. In yet other implementations, the second portion overlaps with the first portion and includes additional resources of the first FPGA.

Then, the OS maps the second portion of processing resources of the first FPGA into an address space of the second user process (block 630). Next, the OS prevents other user processes from accessing the portion of processing resources of the first FPGA (block 635). After block 635, method 600 ends.

Referring now to FIG. 7, another implementation of a method 700 for sharing a FPGA compute engine is shown. A system receives multiple requests to program and execute one or more functions on a FPGA from multiple user processes (block 705). The system causes the FPGA to be partitioned with multiple partitions, with a partition for each user process making a request (block 710). Then, the system allows each user process to access a corresponding partition of the FPGA, wherein multiple user processes simultaneously access the FPGA (block 715). For example, an OS of the system maps each partition into the address space of a corresponding user process. After block 715, method 700 ends.

Turning now to FIG. 8, one implementation of a method 800 for controlling an FPGA compute engine is shown. A system receives, from a first user process, a first request to stop a first FPGA (block 805). Next, the OS stops the first FPGA responsive to receiving the first request (block 810). At a later point in time, the system receives, from the first user process, a second request to restart the first FPGA (block 815). Then, the system restarts the FPGA responsive to receiving the second request (block 820). After block 820, method 800 ends.

Figure 9:
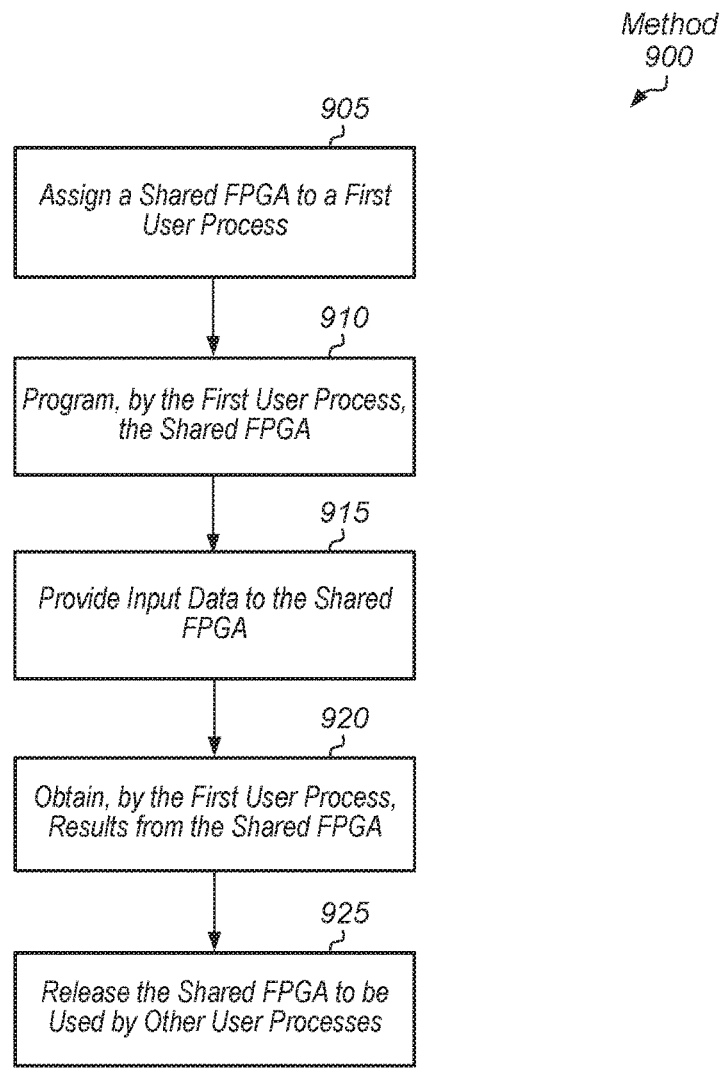
FIG. 9 is a generalized flow diagram illustrating one implementation of a method for utilizing a shared FPGA.

Referring now to FIG. 9, one implementation of a method 900 for utilizing a shared FPGA is shown. A system assigns a shared FPGA to a first user process (block 905). The first user process programs the shared FPGA (block 910). Then, the first user process provides input data to the shared FPGA (block 915). Next, the first user process obtains results from the shared FPGA (block 920). Then, the first user process releases the shared FPGA to be used by other user processes (block 925). After block 925, method 900 ends.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more processors;
one or more memories; and
one or more field programmable gate arrays (FPGAs);
wherein the system is configured to:
receive a request to program, by a first user process, at least a portion of processing resources on a first FPGA, wherein the request is generated by the first user process;
map the portion of processing resources of the first FPGA into an address space of the first user process to enable the first user process to program the first FPGA;
prevent other user processes from accessing the portion of processing resources of the first FPGA; and
program, by the first user process, the first FPGA.

2. The system as recited in claim 1, wherein a processor of the one or more processors is configured to:
detect a release of the portion of the processing resources on the first FPGA by the first user process;
receive a request to program, by a second user process, at least a portion of the processing resources on the first FPGA, wherein the request is generated by the second user process;
map the portion of processing resources of the first FPGA into an address space of the second user process to enable the second user process to program the first FPGA; and
prevent other user processes from accessing the portion of processing resources of the first FPGA.

3. The system as recited in claim 1, wherein the system is configured to:
receive, from multiple user processes, multiple requests to program and execute, by the multiple user processes, one or more functions on a second FPGA; and
program, by the multiple user processes, the second FPGA to create multiple partitions, with a partition for each user process making a request.

4. The system as recited in claim 3, wherein the system is configured to allow each user process to access a corresponding partition of the second FPGA, wherein multiple user processes simultaneously access the second FPGA.

5. The system as recited in claim 1, wherein the system is configured to:

receive, from the first user process, a first request to stop the first FPGA; and
stop the first FPGA responsive to receiving the first request.

6. The system as recited in claim 5, wherein the system is configured to:
receive, from the first user process, a second request to restart the first FPGA; and
restart the first FPGA responsive to receiving the second request.

7. The system as recited in claim 1, wherein the system is configured to:
assign the first FPGA to the first user process, wherein the first FPGA is shared by one or more other user processes;
write, by the first user process, into a register of interconnect logic of the first FPGA, a memory location storing a bitfile used for programming the first FPGA;
provide input data to the first FPGA; and
convey results from the first FPGA to the first user process.

8. The system as recited in claim 7, wherein in response to conveying the results to the first user process, the system is configured to release the first FPGA to be used by the one or more other user processes.

9. A method comprising:
receiving a request to program, by a first user process, at least a portion of processing resources on a first field programmable gate array (FPGA), wherein the request is generated by the first user process;
mapping the portion of processing resources of the first FPGA into an address space of the first user process to enable the first user process to program the first FPGA;
preventing other user processes from accessing the portion of processing resources of the first FPGA; and
programming, by the first user process, the first FPGA.

10. The method as recited in claim 9, further comprising:
detecting a release of the portion of the processing resources on the first FPGA by the first user process;
receiving a request to program, by a second user process, at least a portion of the processing resources on the first FPGA, wherein the request is generated by the second user process;
mapping the portion of processing resources of the first FPGA into an address space of the second user process to enable the second user process to program the first FPGA; and
preventing other user processes from accessing the portion of processing resources of the first FPGA.

11. The method as recited in claim 9, further comprising:
receiving, from multiple user processes, multiple requests to program and execute, by the multiple user processes, one or more functions on a second FPGA; and
programming, by the multiple user processes, the second FPGA to create multiple partitions, with a partition for each user process making a request.

12. The method as recited in claim 11, further comprising allowing each user process to access a corresponding partition of the second FPGA, wherein multiple user processes simultaneously access the second FPGA.

13. The method as recited in claim 9, further comprising:
receiving, from the first user process, a first request to stop the first FPGA; and
stopping the first FPGA responsive to receiving the first request.

14. The method as recited in claim 13, further comprising:
receiving, from the first user process, a second request to restart the first FPGA; and
restarting the FPGA responsive to receiving the second request.

15. The method as recited in claim 9, further comprising:
assigning the first FPGA to the first user process, wherein the first FPGA is shared by one or more other user processes;
writing, by the first user process, into a register of interconnect logic of the first FPGA, a memory location storing a bitfile used for programming the first FPGA;
providing input data to the first FPGA; and
conveying results from the first FPGA to the first user process.

16. The method as recited in claim 15, wherein in response to conveying the results to the first user process, the method further comprises releasing the first FPGA to be used by the one or more other user processes.

17. A non-transitory computer readable storage medium storing program instructions, wherein the program instructions are executable by a processor to:
receive a request to program, by a first user process, at least a portion of processing resources on a first field programmable gate array (FPGA) of one or more FPGAs, wherein the request is generated by the first user process;
map the portion of processing resources of the first FPGA into an address space of the first user process to enable the first user process to program the first FPGA;
prevent other user processes from accessing the portion of processing resources of the first FPGA; and
program, by the first user process, the first FPGA.

18. The non-transitory computer readable storage medium as recited in claim 17, wherein the program instructions are further executable by a processor to:
detect a release of the portion of the processing resources on the first FPGA by the first user process;
receive a request to program, by a second user process, at least a portion of the processing resources on the first FPGA, wherein the request is generated by the second user process;
map the portion of processing resources of the first FPGA into an address space of the second user process to enable the second user process to program the first FPGA; and
prevent other user processes from accessing the portion of processing resources of the first FPGA.

19. The non-transitory computer readable storage medium as recited in claim 17, wherein the program instructions are further executable by a processor to:
receive, from multiple user processes, multiple requests to program and execute, by the multiple user processes, one or more functions on a second FPGA; and
program, by the multiple user processes, the second FPGA to create multiple partitions, with a partition for each user process making a request.

20. The non-transitory computer readable storage medium as recited in claim 19, wherein the program instructions are further executable by a processor to allow each user process to access a corresponding partition of the second FPGA, wherein multiple user processes simultaneously access the second FPGA.

* * * * *